United States Patent
Pham et al.

(10) Patent No.: US 11,390,772 B2
(45) Date of Patent: Jul. 19, 2022

(54) FLUOROPOLYMER COATING COMPOSITION

(71) Applicants: THE CHEMOURS COMPANY FC, LLC, Wilmington, DE (US); DUPONT-MITSUI FLUOROCHEMICALS CO., LTD., Tokyo (JP)

(72) Inventors: Hoai-Nam Pham, Shizuoka (JP); Takumi Terao, Shizuoka (JP); Miki Ito, Shizuoka (JP); Yuta Tani, Tokyo (JP)

(73) Assignee: CHEMOURS-MITSUI FLUOROPRODUCTS CO., LTD., Tokyo (JP)

( * ) Notice: Subject to any disclaimer, the term of this patent is extended or adjusted under 35 U.S.C. 154(b) by 326 days.

(21) Appl. No.: 15/826,955

(22) Filed: Nov. 30, 2017

(65) Prior Publication Data
US 2018/0155569 A1 Jun. 7, 2018

(30) Foreign Application Priority Data

Dec. 1, 2016 (JP) .............. JP2016-234033
Sep. 28, 2017 (JP) .............. JP2017-187671

(51) Int. Cl.
C09D 127/18 (2006.01)
B29C 33/62 (2006.01)
C09D 5/03 (2006.01)

(52) U.S. Cl.
CPC .......... C09D 127/18 (2013.01); B29C 33/62 (2013.01); C09D 5/031 (2013.01)

(58) Field of Classification Search
CPC ...... C09D 127/18; C09D 5/031; C09D 5/033; C09D 7/66–69; B29C 33/62
See application file for complete search history.

(56) References Cited

U.S. PATENT DOCUMENTS

| | | | |
|---|---|---|---|
| 4,472,290 A * | 9/1984 | Caporiccio | C10M 133/42 508/183 |
| 5,700,861 A | 12/1997 | Tomihashi et al. | |
| 6,100,325 A * | 8/2000 | Chittofrati | C08J 3/09 524/546 |
| 6,395,848 B1 * | 5/2002 | Morgan | C08F 14/26 526/214 |
| 6,410,626 B1 | 6/2002 | Wada et al. | |
| 6,987,074 B2 | 1/2006 | Ishii et al. | |
| 9,610,634 B2 | 4/2017 | Kaneumi et al. | |
| 9,937,551 B2 | 4/2018 | Kaneumi et al. | |
| 2012/0178075 A1 | 7/2012 | Kaneumi et al. | |
| 2015/0306659 A1 | 10/2015 | Kaneumi et al. | |

FOREIGN PATENT DOCUMENTS

| | | |
|---|---|---|
| EP | 0 705 671 A1 | 4/1996 |
| EP | 1 734 090 A2 | 12/2006 |
| EP | 2479216 A1 | 7/2012 |
| JP | 02140255 A * | 5/1990 |
| JP | 2140255 A | 5/1990 |
| JP | 2658172 B2 | 9/1997 |
| JP | 2003027004 A | 1/2003 |
| JP | 2004-74646 A | 3/2004 |
| JP | 2011-63709 A | 3/2011 |
| WO | 98/16361 A1 | 4/1998 |

OTHER PUBLICATIONS

Translation of JP 2008-231387 (Year: 2008).*
Wikipedia. Polytetrafluoroethylene. 2020. <https://en.wikipedia.org/wiki/Polytetrafluoroethylene> (Year: 2020).*
Machine Translation of JP-02140255-A (Year: 1990).*
Helmick, Larry S., and William R. Jones Jr. "Determination of the thermal stability of perfluoroalkylethers." (1990). (Year: 1990).*
PCT International Search Report and Written Opinion dated Feb. 8, 2018 (PCT/US2017/063848.

* cited by examiner

*Primary Examiner* — Leith S Shafi
(74) *Attorney, Agent, or Firm* — Kraig Haverstick

(57) ABSTRACT

This application provides a coating film having excellent durability and wear resistance that, when applied to a mold surface, has excellent releasability (non-adhesiveness) over a long period of time, and a fluoropolymer coating composition that is able to form such a coating film. The fluoropolymer coating composition contains a fluoropolymer and a fluoro oil, where the decomposition temperature of the fluoro oil is higher than the melting point of the fluoropolymer.

12 Claims, No Drawings

FLUOROPOLYMER COATING COMPOSITION

CROSS-REFERENCE TO RELATED APPLICATIONS

This application claims priority to the following applications: Japanese patent application no. JP2017-187671, filed Sep. 28, 2017 (Reference No. AP375(P)); and Japanese patent application no. JP 2016-234033, filed Dec. 1, 2016 (Reference No. AP375).

BACKGROUND OF THE INVENTION

Field of the Disclosure

The present invention relates to a fluoropolymer coating composition, and particularly relates to a fluoropolymer coating composition with excellent durability and wear resistance that is able to sustain non-adhesiveness and releasability of a coating film for a long period of time.

Description of Related Art

Fluoropolymers have excellent heat resistance, chemical resistance, electrical properties, and mechanical properties, and have low coefficients of friction as well as non-adhesiveness and water and oil repellency. Fluoropolymers are therefore widely used in all types of industrial fields such as chemical, machinery, electrical machinery industries, and the like. Because melt-processable fluoropolymers particularly demonstrate fluidity at a temperature above a melting point, the generation of pin holes can be suppressed when formed into a coating, and thus the fluoropolymers are used as coating compositions for fluoropolymer coatings.

Fluoropolymer coatings utilizing the non-adhesiveness and water and oil repellency of fluoropolymers are used in cookware such as frying pans, rice cookers, and the like, office automation (OA) equipment such as fixing rolls/belts for fixing toners, and the like, and other various fields, and because these coatings have further spread to other fields of use such as inkjet nozzles and chemical plant equipment, and the like, there is a demand for coatings with enhanced and more durable non-adhesiveness and water and oil repellency.

For example, an aqueous dispersion composition made from: a compound having a perfluoroalkyl group; a fluoro oil; a repellent selected from fluorine oil, fluorosilicone oil, and the like; an organic silicon compound; and a resin containing fluorine is disclosed in Patent Document 1 described below as a coating agent for granting waterproofing effects to the surfaces of porous civil engineering building materials, such as concrete, and the like. Furthermore, a coating composition formed by mixing an aqueous dispersion of polytetrafluoroethylene with an aqueous dispersion of perfluoropolyether is disclosed in Patent Document 2 described below as a coating composition for vehicle painted surfaces.

Meanwhile, to enhance releasability when a polymer material, such as plastic or rubber, ceramic, cement, and the like, are formed using a mold, it is well known that, by utilizing the aforementioned non-adhesiveness that fluoropolymers possess, a fluoropolymer coating can be formed on (Patent Documents 3 and 4, and the like), or a releasing agent made from a fluorine compound can be applied to, a mold surface (Patent Documents 5 and 6, and the like).

PRIOR ART DOCUMENTS

Patent Document 1: Japanese Patent No. 3505719
Patent Document 2: Japanese Patent No. 4116763
Patent Document 3: Japanese Unexamined Patent Application Publication No. 2002-516618
Patent Document 4: Japanese Unexamined Patent Application Publication No. 2004-74646
Patent Document 5: Japanese Patent No. 2658172
Patent Document 6: Japanese Unexamined Patent Application Publication No. 2011-63709

SUMMARY OF THE INVENTION

Problem to be Resolved by the Invention

However, conventional fluoropolymer coatings formed on mold surfaces have a problem in that such coatings lose releasability when molding is done repeatedly, and are thus as yet not fully satisfactory in terms of durability. Meanwhile, releasing agents have to be re-applied each time, or every few times, molding is performed and are thus as yet not fully satisfactory in terms of productivity.

Accordingly, an object of the present invention is to provide a coating film having excellent durability and wear resistance that, when applied to a mold surface, is able to express excellent releasability (non-adhesiveness) over a long period of time, and a coating composition that is able to form such a coating film.

Means for Solving the Problems

The present invention provides a fluoropolymer coating composition containing a fluoropolymer and a fluoro oil, where the decomposition temperature of the fluoro oil is higher than the melting point of the fluoropolymer.

In the fluoropolymer coating composition according to the present invention, it is preferable that;
1. The fluoro oil is contained in an amount such that the oil is 1 to 35 wt % of a total amount of a polymer solid content and the fluoro oil in the coating composition,
2. The decomposition temperature of the fluoro oil is at least 10° C. higher than the melting point of the fluoropolymer,
3. The fluoro oil is dispersed in the coating composition,
4. The fluoro oil is dispersed with an average particle diameter of 20 μm or less,
5. The composition contains a surfactant,
6. The fluoropolymer is a melt-processable perfluoropolymer,
7. The composition contains a filler,
8. The filler is contained in an amount such that the filler is 0.1 to 10 wt % based on a coating solid content,
9. The composition is a water based coating or a powder coating, and
10. The composition is for top coating.

According to the present invention, after the fluoropolymer coating composition is painted, a coating film forming method—characterized in that said method heat treats to a temperature of at least a melting point of the fluoropolymer—is provided.

Additionally, according to the present invention, a coating film is provided, where the film is made from the fluoropolymer coating composition and fluoro oil is dispersed in the film.

Additionally, according to the present invention, a mold, characterized in that the coating film is formed on a surface thereof, is also provided.

Effect of the Invention

A coating film excelling in releasability (non-adhesiveness) more so than fluoropolymer coating compositions used up to now, and having durability—superior to the durability of conventional releasing agents or coating compositions able to form coating films having releasability—able to express excellent releasability (non-adhesiveness) over a long period of time can be formed from the coating composition according to the present invention.

Furthermore, a mold on which the coating film made from the coating composition according to the present invention is formed has excellent molded article releasability, and thus has excellent formability. Furthermore, the mold can sustain said releasability over a long period of time, and thus productivity is also excellent.

DETAILED DESCRIPTION OF THE INVENTION

Coating Composition

An important characteristic of the coating composition according to the present invention is that the composition contains a fluoropolymer and fluoro oil, where the decomposition temperature of the fluoro oil is higher than the melting point of the fluoropolymer.

That is, because a fluoro oil that is in a fluid state at room temperatures is included in the coating composition according to the present invention, the fluoro oil seeps into a formed fluoropolymer coating film surface, making it possible to further enhance a non-adhesiveness of a fluoropolymer coating film.

Furthermore, the fluoro oil used in the present invention has a decomposition temperature that is higher than the melting point of the fluoropolymer, and thus, even if heat treated at a temperature around the melting point of the fluoropolymer, the fluoro oil will not decompose and volatilize into a gas. As a result, not only will the aforementioned effect, brought on by the fluoro oil, not be impaired, the generation of coating film defects, such as bubble marks, and the like, caused by the volatilization of the fluoro oil, is effectively prevented.

Furthermore, as will be described later, in the present invention, because the fluoro oil is present in a state where said oil is dispersed in the coating composition, the fluoro oil is also present in a state where the oil is dispersed inside a formed coating film. Therefore, when the coating film is worn due to use, the fluoro oil inside the coating film gradually seeps to the surface thereof, thus making it possible to express a high level of non-adhesiveness over a long period of time.

To effectively achieve the aforementioned effect, obtainable because the fluoro oil is in a state where said oil is dispersed in the coating film, an average particle diameter of fluoro oil particles dispersed in the coating composition is preferably 20 µm or less, and particularly preferably 10 µm or less. Note that the method for measuring the average particle diameter will be described later.

In the present invention, as was described above, it is important that the decomposition temperature of the fluoro oil be higher than the melting point of the fluoropolymer, and, specifically, is thus preferably at least 10° C. higher, more preferably at least 30° C. higher, and even more preferably at least 50° C. higher than the melting point of the fluoropolymer. Therefore, effects on the fluoro oil during coating film forming with heat treating can be reliably reduced, thus ensuring further enhancement of the non-adhesiveness of the coating film by the fluoro oil.

Note that the melting point of the fluoropolymer according to the present invention is the temperature corresponding to the melting peak measured using a Differential Scanning calorimeter (DSC) based on ASTM D3307, that the decomposition temperature of the fluoro oil is the temperature derived by calculating the results of a thermal gravity measurement (TGA) using the method disclosed in JIS K7120, and that the detailed measuring methods will be described later in the examples.

Furthermore, by including fluoro oil in the coating composition according to the present invention, wear is reduced by fluoro oil that seeps to the coating film surface, thereby enhancing the wear resistance of the coating film. Additionally, by adding a filler to the coating composition, coupled with the presence of the fluoro oil, wear resistance can be further enhanced, such that the composition can express the excellent releasability described above over a long period of time. Therefore, forming the coating film on a mold surface leads to better productivity.

As long as the coating composition according to the present invention includes a combination of the aforementioned fluoropolymer and fluoro oil, the composition may be any form of water based coating composition, solvent based coating composition, or powder coating composition, while water based coating compositions or powder coating compositions are preferable from an environmental and cost perspective. Furthermore, powder coating compositions can be use to form very thick coating films.

Fluoropolymer

Examples of fluoropolymers that can be used to configure the coating composition of the present invention include, but are not limited to, polytetrafluoroethylene (PTFE), tetrafluoroethylene and perfluoro(alkyl vinyl ether) copolymer (PFA), tetrafluoroethylene and hexafluoropropylene copolymer (FEP), tetrafluoroethylene hexafluoropropylene perfluoro (alkyl vinyl ether) copolymer, tetrafluoroethylene and ethylene copolymer, polyvinylidene fluoride, polychlorotrifluoroethylene, chlorotrifluoroethylene ethylene copolymer, and the like.

From the perspective of being able to suppress the generation of pin holes and obtain a uniform, smooth coating film when the coating film is formed, it is preferable that a melt-processable fluoropolymer exhibiting melt fluidity above the melting point thereof be used. From the perspective of coating film non-adhesiveness and heat resistance, it is preferable to use a melt-processable perfluoropolymer, such as a low molecular weight PTFE, PFA, FEP, or tetrafluoroethylene and hexafluoropropylene and perfluoro (alkyl vinyl ether) copolymer.

It is preferable that the alkyl group of the perfluoro(alkyl vinyl ether) in the PFA have 1 to 5 carbon atoms, where among these, perfluoro(propyl vinyl ether) (PPVE), perfluoro(ethyl vinyl ether) (PEVE), and perfluoro(methyl vinyl ether) (PMVE) are particularly preferable. It is preferable that the amount of perfluoro(alkyl vinyl ether) in the PFA be in a range of 1 to 50 wt %.

Fluoro Oil

The fluoro oil according to the present invention is an organic compound containing fluorine that is in the liquid phase at room temperature. Examples of the fluoro oil include, but are not limited to perfluoropolyethers (PFPE), perfluoroalkyl polyethers, and telomers of fluorinated monomers (for example, tetrafluoroethylene (TFE), ethylene trifluoride, vinylidene fluoride, chlorotetrafluoroethylene (CTFE), fluorinated acrylic monomers, and the like, and other fluorinated hydrocarbon compounds, and the like.

PFPE having small surface energy and able to efficiently enhance the non-adhesiveness of the coating film can be appropriately used in the present invention, and can be obtained using products going by the commercial names of Krytox™ (manufactured by Chemours Company) or DEMNUM™ (manufactured by Daikin Industries, Ltd.), and the like.

The fluoro oil in the coating composition according to the present invention is preferably contained in an amount such that the oil is 1 to 35 wt %, and preferably 5 to 20 wt %, of the total weight of a polymer solid content (weight of the fluoropolymer contained in the coating composition) and the fluoro oil in the coating composition. If the amount of the fluoro oil is below the aforementioned range, there is a risk that it will not be possible to enhance the non-adhesiveness of the coating film when compared to cases where said amount is within said range. Meanwhile, when the amount of the fluoro oil is above the aforementioned range, there is a risk that coating film defects may occur more readily.

Furthermore, it is preferable that the contained amount of the fluoropolymer be at least 80 wt %, and particularly preferably at least 90 wt %, based on a coating solid content (the entire solid content left behind as the coating film excluding the fluoro oil) of the coating composition, and this amount is preferable from the perspective of adequately providing the coating film with the characteristics described above, those characteristics being the heat resistance, chemical resistance, and the like, possessed by fluoropolymers.

Preparation of the Coating Composition

While, as was described above, the coating composition according to the present invention may be any form of water or solvent based coating composition or powder coating composition, the composition is, from an environmental perspective, preferably a water based coating composition or powder coating composition. Furthermore, examples of methods for preparing the coating composition include, but are not limited to, the methods described below.

When the coating composition according to the present invention is prepared as a water based coating composition, the composition can be prepared using a method that mixes fluoro oil, and optionally other additives to be described later, in an aqueous dispersion of fluoropolymer and a liquid mixture (for example, an existing fluoropolymer water based coating, or the like) thereof, or using a method that mixes a powder of a fluoropolymer in fluoro oil and an aqueous solvent together with other additives, or the like.

Furthermore, when the coating composition according to the present invention is prepared as a solvent based coating composition, the composition can be prepared using a method that mixes a powder of a fluoropolymer in fluoro oil and a solvent along with other additives, or using a method that adds fluoro oil and other additives to a fluoropolymer solution.

Additionally, when the coating composition according to the present invention is prepared as a powder coating composition, the composition can be prepared using a method that coagulates (co-coagulates) a fluoropolymer aqueous dispersion and fluoro oil simultaneously to obtain a composite fluoropolymer powder.

The fluoropolymer aqueous dispersion used in the coating composition according to the present invention can be prepared by dispersing the fluoropolymer evenly and stably in an aqueous solution using a surfactant, and the like, or by polymerizing the fluoropolymer with a water based emulsion using a surfactant and an initiator, or a chain transfer agent or the like, as necessary.

It is preferable that fluoropolymer particles having an average particle diameter of 0.01 to 180 μm be dispersed in the fluoropolymer aqueous dispersion until said particles are 10 to 70 wt % of the aqueous solution.

While the fluoropolymer aqueous dispersion can be used as-is in the coating composition according to the present invention, a filler and a variety of additives, for example, surfactants (examples thereof include polyoxyethylene alkyl ether, polyoxyethylene alkyl phenyl ether type nonionic surfactants; such as LIOCO™ manufactured by LION, Inc., the TRITON™ and TERGITOL™ series manufactured by the Dow Chemical Company, and EMALGEN™ manufactured by KAO, Inc., sulfosuccinates; such as REPAL™ manufactured by LION, Inc., EMAL™, PELEX™, and the like, manufactured by KAO, Inc.; and polycarboxylate, acrylic salt type polymer surfactants, such as alkyl ether sulfonic acid sodium salts, sulfate mono-long chain alkyl based anionic surfactants, LEOAL™ manufactured by LION, Inc., OROTAN™ manufactured by the Dow Chemical Company, and the like), film forming agents (examples include polymeric film forming agents such as polyamides, polyamide imides, acrylics, acetates, and the like; higher alcohols and ethers; polymeric surfactants having a film forming effect, and the like), and thickeners (examples include soluble celluloses, solvent dispersion thickeners, sodium alginates, caseins, sodium caseinates, xanthan gums, polyacrylic acids, acrylic esters, and the like) used in normal coatings can be added thereto according to required characteristics, such as dispersibility, conductivity, foaming prevention, improved wear resistance, and the like.

Aqueous Coating Composition

The water based coating composition according to the present invention can be prepared by adding fluoro oil to the fluoropolymer aqueous dispersion prepared using the aforementioned method or an aqueous composition liquid thereof such that the fluoro oil is 1 to 35 wt % with respect to a total weight of the polymer solid content (weight of the fluoropolymer contained in the coating composition) and the fluoro oil in the coating composition, and then by mixing and stirring the dispersion or liquid.

While the fluoro oil can be used in the coating composition according to the present invention alone, as was described above, it is preferable that a surfactant be used in combination therewith so that the fluoro oil can be well dispersed in the composition.

While any conventionally well-known surfactant can be used as the surfactant for enhancing the dispersibility of the fluoro oil, because the fluoro oil can be dispersed to a high degree, particularly in the present invention, through the use of a surfactant with excellent affinity to the fluoro oil, it is preferable that a fluorine based surfactant containing fluorine be used.

Examples of such surfactants include, but are not limited to, anion type fluorine type surfactants, such as fluoroalkyl carboxylates, fluoroalkyl sulfonates, fluoroalkyl phosphate esters, fluoroalkenyl sulfonates, fluoroalkenyl carboxylates, and the like; amphoteric fluorosurfactants, such as perfluoroalkyl betaines, perfluoroalkyl amine oxides, and the like; cationic fluorochemical surfactants, such as fluoroalkyl trimethyl ammoniums, and the like; nonion type fluorosurfactants, such as fluoroalkyl ethylene oxide adducts, fluoroalkyl propylene oxide adducts, fluoroalkyl group-containing oligomers, and the like.

To ensure the fluoro oil is well dispersed, it is preferable that the amount of surfactant added be 1 to 150 parts by weight, and more preferably 5 to 100 parts by weight, with respect to each 100 parts by weight of the fluoro oil.

Furthermore, when the aforementioned surfactant is used, it is preferable that the fluoro oil be diluted using a fluorinated solvent, and that the viscosity of the fluoro oil be lowered. Therefore, when the fluoropolymer is mixed and stirred, it is possible to obtain a dispersion in which the fluoro oil is well dispersed.

Examples of the fluorinated solvent used to dilute the fluoro oil include hydrofluorocarbons (HFC), perfluorocarbons (PFC), hydrochlorofluorocarbons (HCFC), chlorofluorocarbons (CFC), hydrofluoroolefins (HFO), hydrochlorofluoroolefins (HCFO), hydrofluoroethers (HFE), and the like.

It is preferable that the amount of fluorinated solvent that is added be 100 to 500 parts by weight for every 100 parts by weight of the fluoro oil.

Furthermore, so that the fluoro oil is well dispersed, it is preferable that the oil be dispersed using ultrasonic dispersion or a high shear rate, in conjunction with using said surfactant. A commonly used ultrasonic disperser, stirrer, or a variety of homogenizers (high pressure, high speed, ultrasonic, and the like) can be used for these dispersions. Through the use thereof, the fluoro oil can be well dispersed without being diluted using a fluorinated solvent, which is preferable from the perspective that doing so simplifies the process and lowers costs related to the use of the fluorinated solvent. Furthermore, the dispersion described above can naturally be done after the fluoro oil has been diluted with the fluorinated solvent, and better dispersion would be expected as a result of doing so.

Solvent Based Coating Composition

Furthermore, in the case of a solvent based coating composition, a fluoropolymer solution or a fluoropolymer solvent solution is prepared, the fluoro oil, or preferably the fluoro oil dispersion described above, is added to this solution such that the amount of thereof is 1 to 35 wt % of the total weight of the polymer solid content (weight of the fluoropolymer contained in the coating composition) and the fluoro oil in the coating composition, and then the composition can be prepared by stirring and mixing.

Powder Coating Composition

The powder coating composition according to the present invention is created by adding fluoro oil, and preferably the aforementioned fluoro oil dispersion, to the fluoropolymer aqueous dispersion prepared using the aforementioned method so that the amount thereof is 1 to 35 wt % of the total weight of the polymer solid content (weight of the fluoropolymer contained in the coating composition) and the fluoro oil in the coating composition, and then by stirring to co-coagulate the fluoropolymer and the fluoro oil. After granulating the coagulated granules by stirring the granules for 10 to 60 minutes at a stirring speed of 100 to 500 rpm so that average particle diameter becomes 1 to 200 μm, the fluoro oil is made—through separating, washing, and drying—to fill voids in primary particles of the fluoropolymer, and thus a composite powder of the fluoropolymer and the fluoro oil in which the fluoro oil is uniformly present can be prepared. Large, coarse particles with particle diameters of at least 200 μm generated by coagulation or over-granulation can be crushed into fine particles as necessary.

Note that it is preferable that an electrolytic material, such as HCl, $H_2SO_4$, $HNO_3$, $H_3PO_4$, $Na_2SO_4$, $MgCl_2$, $CaCl_2$, HCOONa, $CH_3COOK$, $(NH_4)_2CO_3$, and the like be added to cause the fluoropolymer primary particles to be chemically coagulated. Furthermore, it is preferable to add an organic solvent incompatible with water (preferably a fluorinated solvent) as needed so as to uniformly granulate the coagulated particles.

Other Fillers

A variety of organic and inorganic fillers can be added to the coating composition according to the present invention, based on the characteristics required thereof. Examples of organic fillers include engineering plastics, such as polyarylene sulfide, polyether ether ketone, polyamide, polyimide, and the like. Examples of inorganic fillers include metal powder, metal oxide (aluminum oxide, zinc oxide, tin oxide, titanium oxide, and the like), glass, ceramic, silicon carbide, silicon oxide, calcium fluoride, carbon black, graphite, mica, barium sulfate, and the like. Fillers having a variety of shapes, such as particle shaped, fiber shaped, flaked shaped fillers, and the like, can be used as the shape of the filler.

As was described above, while wear resistance is enhanced by the presence of fluoro oil in the coating composition according to the present invention, wear resistance is further enhanced by the addition of the filler. Examples of particularly preferable fillers include, but are not limited to, silicon carbide (SiC), silica, and polyimide (PI).

While the added amount of the filler depends on the filler used and thus cannot be specified definitively, it is preferable to add an amount such that the filler is in a range of 0.1 to 10 wt % based on the coating solid content (the entire solid content left behind as the coating film excluding the fluoro oil, that is, an amount with respect to the total amount of the fluoropolymer and the filler) of the coating composition. When the amount of added filler is below this range, the enhancement of wear resistance due to the added filler becomes poorer, meanwhile, when the amount is above this range, releasability is lower.

When the coating composition is a liquid coating such as a water based coating, and the like, the filler can be used by dispersing the filler in a liquid medium, such as water or the like. When the coating composition is a powder coating, a method, such as dry blending that mixes the coating composition powder and the filler directly, or a co-coagulation method or the like where a filler is added to an aqueous dispersion and then stirred and coagulated together can be used.

Coating Method

When the coating composition according to the present invention is a liquid (water or solvent based) coating composition, or a powder coating composition, such as a sprayed coating, dipped coating, or the like, the composition can be coated using a conventionally well-known coating method, such as electrostatic coating, or the like.

It is preferable that, after coating, the coating film is formed by subjecting the coated coating composition to heat treatment at or above the melting point of the fluoropolymer. This makes it possible to melt the coated coating composition causing it to flow and thus form an even coating film.

Examples of base materials subject to being coated with the coating composition according to the present invention preferably include, but are not limited to, base materials that can withstand heat treating, such as metal base materials, like aluminum, iron, stainless steel, and the like, glass, ceramic, heat resistant plastic base materials, and the like.

Because the coating composition according to the present invention has the excellent durability of the formed coating film and is thus able to maintain non-adhesiveness and releasability over a long period of time, the composition is particularly preferably used as a top coating for covering a surface of a forming mold.

While a thickness of a coating film of the top coating may be appropriately selected based on an application and a portion to which the film will be applied, coating so as to create a film thickness after heat treatment and melting process of at least 5 μm, and preferably at least 10 μm, is preferred. When the film thickness is less than this, there is a risk that forming a continuous film will become difficult causing defects in the coating film and leaving the coating film prone to rapid loss of performance (non-adhesiveness, water and oil repellency) due to wear.

It is preferable that, as has been described above, the coating composition according to the present invention be used in an outermost surface layer as a top coating and can be applied to a base material (mold surface) using the aforementioned method.

While the coating composition according to the present invention can be applied directly to a base material surface, surface adhesion may be increased by applying a surface chemical treatment or primer coating to the base material. A variety of engineering plastic resins (for example, polyimides, polyamides, polyamide imides, polyether imides, polyarylene sulfides, polyether ether ketones, and the like) highly adhesive with respect to base materials are preferably included as primer coatings. Furthermore, fluoropolymers, particularly PFA, are preferably included to enhance interlayer adhesion with the coating film produced by the coating composition according to the present invention. In order to make adhesion to both the coating film produced by the coating composition according to the present invention and the base material satisfactory, the percentage of the fluoropolymer in the primer coating is preferably 50 to 90 wt %, and the percentage of the engineering plastic resin and the filler in the primer is preferably 10 to 50 wt %.

Coating Film

Because the coating film obtained using the coating composition according to the present invention has a high degree of non-adhesiveness and water and oil repellency, it is preferable that an oil contact angle be at least 60 degrees, and more preferably at least 70 degrees.

Furthermore, in consideration of making it possible to exhibit coating film non-adhesiveness (releasability) for a long period of time, it is preferable that the fluoro oil be included in the coating film such that the amount of said oil therein is 1 to 35 wt %, and particularly preferably 5 to 20 wt %, thereof.

While a film thickness of a coating film formed using the coating composition according to the present invention can be appropriately selected based on an application and a portion to which the film is to be applied, it is preferable that coating be done such that the film thickness after heat treatment and melting treatment, particularly when used in order to enhance the releasability of a mold, is at least 5 μm, and particularly preferably in a range of 5 to 300 μm. If the film thickness is thinner than the aforementioned range, there is a risk that continuous coating film formation will be impossible causing more coating film defects than when the thickness is in said range, there is also a risk that the coating film will lose performance (non-adhesiveness (releasability) and water and oil repellency) due to wear, meanwhile, economic efficiency is lost when the film thickness is thicker than in this range.

EXAMPLES

Measurement of Physical Properties

Decomposition Temperature of the Fluoro Oil

The temperature of approximately 50 mg of fluoro oil was raised 10° C. per minute from room temperature to 600° C. in a nitrogen atmosphere using a thermogravimetric analyzing device (TGA2050: manufactured by TA Instruments, Inc.), and a temperature calculated using the method disclosed in JIS K7120 from an obtained temperature-weight curve was used as decomposition temperature.

Melting Point of the Fluoropolymer

The temperature corresponding to a melting peak measured using a differential scanning calorimeter (Pyris1 Type DSC, manufactured by PerkinElmer, Inc.) in accordance with ASTMD 3307 was used as a melting point.

State of Dispersion of the Fluoro Oil

Particles in the Coating (Visual Observation)

The coating was checked visually, to confirm the state of dispersion of the fluoro oil. Judgment criteria are as described below.

Favorable dispersion: The fluoro oil is well dispersed, and no two layer separation due to sedimentation can confirmed visually within 30 minutes after stirring.

Inferior dispersion: It is possible to visually confirm that two layer separation due to sedimentation had begun within 30 minutes after stirring.

Average Particle Diameter of the Fluoro Oil Particles in the Coating

Droplets of coating were dripped onto a glass slide (76×26 mm Micro slide glass, 1 to 1.2 mm thick, manufactured by Matsunami), and the slide was placed on an aluminum base material (50 mm×100 mm, 1 mm thick) and then observed using a reflection mode of an optical microscope (KH-1300, manufactured by Hirox, Inc.). The fluoro oil particles were observed using photographs taken at magnifications of 2000 to 2500 times. An average value derived from a sample size of n=20 was used as an average particle diameter.

Coating Evaluation

State of Coating Formation (Visual Observation)

An obtained coating film was observed visually to confirm the state thereof. Judgment criteria are as described below.

Favorable: There is no unevenness nor any defects in the coating film.

Defects present: There are defects in the coating film. (Part of the base material surface is exposed)

Unevenness present: While there are no defects (exposure of the base material surface), the film is not flat. Unevenness and undulations are visible.

Oil Contact Angle

Contact angle (droplet size: approximately 2 μL) of n-hexadecane was measured using a fully automatic contact angle meter (Kyowa Interface Science Co., Ltd., DM-701) in a measurement environment of 25° C. and humidity of 60%.

Film Thickness Measurement

A coated base material was cut, and a cross section thereof was measured using an optical microscope.

Soy Sauce & Sugar Test

A soy sauce and sugar blend (soy sauce to sugar=50:50) for testing was produced. The aforementioned soy sauce and sugar blend was applied to a coating film produced by coating a primer and the coating composition of Examples 1 to 3 and Comparative Example 1, to be described later, onto an aluminum base material (50 mm×100 mm, 1 mm thick), and to a surface (50 mm×50 mm) of an uncoated aluminum base material (50 mm×100 mm, 1 mm thick), and then, these materials were stacked and secured in two places using clips. Next, the materials were heat treated in an oven for 30 minutes at 120° C., and then for 30 minutes at 200° C., and were then cooled to room temperature. The peel strength of the stacked samples was measured using a tensile tester (Tensilon RTC-1310A, manufactured by Orientec) at a tensile rate of 20 mm/min., and an average value was derived from five samples.

To evaluate durability, the tested samples were washed with water, and then, the same samples were subjected to the aforementioned test repeatedly five times. Additionally, the repeatedly tested samples were heat treated in an oven for 30 hours at 250° C., and then, the same measurements were taken.

Measurement of the Amount of Fluoro Oil in the Coating

An approximately 30 mg sample of the coating film was collected using scissors, and then, just as was done for the decomposition temperature measurement for the fluoro oil, the temperature of the sample was raised 10° C. each minute from room temperature up to 600° C. in a nitrogen atmosphere using a thermogravimetric analyzing device (TGA2050, manufactured by TA Instruments, Inc.). Because the decomposition temperature of the fluoropolymer in the coating film is higher than the decomposition temperature of the fluoro oil, a weight change in the range from the decomposition start temperature to the decomposition completed temperature of the fluoro oil was measured, and this change was then used to derive the fluoro oil remaining in the coating film.

Tribometer (Coating Durability)

A contact and a sample were slid linearly using a TS501 (manufactured by Kyowa Interface Science Co., Ltd.) at a specified moving speed with a load of 100 g applied thereto, a frictional force during said sliding was measured, and a coefficient of friction was calculated. (Static Friction Coefficient, and Dynamic Friction Coefficient at 50th Cycle and 500th Cycle). The test conditions were as described below.

Load: 100 g
Moving speed: 10 mm/sec.
Moving distance per cycle (each way): 10 mm Coating Wear Resistance Test Loss due to wear was measured using an NUS-ISO3 Suga Wear Testing Machine manufactured by Suga Test Instruments Co., Ltd. in accordance with JIS K5600-5-10 (test piece reciprocating method). The test conditions were as described below.

Load: 1 N
Number of reciprocations: 100
Abrasive paper used: Silicon carbide paper, P-600 grade Coating Process A coating film for use in performance evaluation was produced using the following procedure.

(1) Base Material Surface Treatment (Coating Film Cleaning)

The surface of an aluminum base material (JIS A1050 compliant material, 95 mm×150 mm, 1 mm thick) was degreased using isopropyl alcohol, and then, a sandblaster (Numablaster SGF-4(A)S-E566, manufactured by Fuji Manufacturing Co., Ltd.) was used to subject the surface to roughening by shot blasting using #60 alumina (Showa Blaster, manufactured by Showa Denko KK).

(2) Undercoating (Primer Application)

A coating was applied to the base material treated as described in (1) above using an air spray coating gun (W-88-10E2 φ 1 mm nozzle (manual gun)), manufactured by Anest Iwata Corporation) to spray a liquid primer coating PJ-YL902 (manufactured by Du Pont-Mitsui Fluorochemicals Co., Ltd.) at an air pressure of 2.5 to 3.0 kgf/cm$^2$. Coating was done so that a coated liquid mass was approximately 0.2 g (0.15 to 0.25 g) per sheet of base material, and then, drying was performed in a forced draft circulation furnace at 120° C. for 15 minutes to form a coating film with a film thickness of 6 to 8 μm. The coating environment was 25° C. with humidity of 60% RH.

(3) Coating Formation by Overcoating

A coating was applied to the base material treated as described in (1) and (2) above using an air spray coating gun (W-88-10E2 φ 1 mm nozzle (manual gun), manufactured by Anest Iwata Corporation) to spray a liquid coating composition of an example to be described later at an air pressure of 2.5 to 3.0 kgf/cm$^2$. Coating was done so that a coated liquid mass was approximately 0.2 g (0.15 to 0.25 g) per sheet of base material, and then, drying was performed in a forced draft circulation furnace at 120° C. for 15 minutes followed by a further heat treatment at 340° C. for 30 minutes to form a coating film with a film thickness of 8 to 10 μm. The coating environment was 25° C. with humidity of 60% RH.

Furthermore, a powder coating was applied to a base material using a stainless steel sieve (JIS Z8801 compliant) with a mesh opening of 180 μm and linear spacing of 126 μm on an aluminum base material coated with the aforementioned primer in the powder coating composition of an example to be described later. After coating, and after being subjected to heating and firing for 20 minutes at 380° C. in a forced draft circulation furnace, the material was cooled at room temperature to form a coating film. By adjusting the coating amounts, two types of coating films—one with a film thickness of 200 μm and one with a film thickness of 60 μm—were obtained.

EXAMPLES

Example 1

An amount of 35.6 g of a fluorinated solvent (Vertrel (Registered Trademark) Suprion, manufactured by Du Pont-Mitsui Fluorochemicals Co., Ltd.), 8.89 g of PFPE (decomposition temperature: 426° C.) as fluoro oil, and 4.99 g of a fluorochemical surfactant (Capstone (Registered Trademark) FS-31 (nonion type fluorochemical surfactant 25% aqueous solution), manufactured by Chemours Company) were put in a 1 liter stainless steel beaker, and then, stirred for five minutes at 480 rpm using a down flow type propeller type 4-bladed stirrer. Then, 200 g of EJ-CL500 (average particle diameter of included PFA: approximately 0.2 μm, melting point: 309° C., PFA polymer solid content: 37 wt %), which is a fluoropolymer (PFA) water based coating for top coating manufactured by Du Pont-Mitsui Fluorochemicals Co., Ltd., was added, and the contents were stirred for an additional 15 minutes. The above blend was heated in a water bath at approximately 70° C. for 1 hour while being stirred to volatilize the fluorinated solvent, and thereby a fluoropolymer coating composition was obtained. The obtained coating composition was coated onto an aluminum base material which had been subjected to a primer treatment using the method described above, and thereby a coating film sample was produced. (Contained amount of fluoro oil with respect to the total weight of the polymer solid content (fluoropolymer) and the fluoro oil of the fluoropolymer coating composition: 10.7 wt %)

Example 2

Except that the amount of the fluorinated solvent was 80 g, the amount of the fluoro oil was 20 g, and the amount of the fluorochemical surfactant was 6.12 g, a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 21.3 wt %)

Example 3

Except that the amount of the fluorinated solvent was 16.8 g, the amount of the fluoro oil was 4.21 g, and the amount of the fluorochemical surfactant was 4.51 g, a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 5.38 wt %)

Example 4

Except that the amount of the fluorinated solvent was 137 g, the amount of the fluoro oil was 34.3 g, and the amount of the fluorochemical surfactant was 7.58 g, a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 31.7 wt %)

Example 5

Except that the amount of the fluorinated solvent was 213 g, the amount of the fluoro oil was 53.3 g, and the amount of the fluorochemical surfactant was 9.52 g, a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 41.9 wt %)

Example 6

Except that the amount of the fluorinated solvent was 320 g, the amount of the fluoro oil was 80.0 g, and the amount of the fluorochemical surfactant was 12.2 g, a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 51.9 wt %)

Example 7

Except that the amount of the fluorinated solvent was 480 g, the amount of the fluoro oil was 120 g, and the amount of the fluorochemical surfactant was 16.3 g, a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 61.9 wt %)

Example 8

Without using the fluorinated solvent or the fluorochemical surfactant, 8.89 g of PFPE (decomposition temperature: 426° C.) as fluoro oil and 200 g of EJ-CL500 (average particle diameter of included PFA: approximately 0.2 μm, melting point: 309° C., PFA polymer solid content: 37 wt %), which is a fluoropolymer (PFA) water based coating for top coating manufactured by Du Pont-Mitsui Fluorochemicals Co., Ltd., were inserted into a 1 liter stainless steel beaker, and then stirred for 15 minutes at 480 rpm using a down flow type propeller type 4-bladed stirrer. The obtained coating composition was coated onto an aluminum base material which had been subjected to a primer treatment using the method described above, and thus a coating film sample was produced. (Contained amount of fluoro oil with respect to the total weight of the polymer solid content (fluoropolymer) and the fluoro oil of the fluoropolymer coating composition: 10.7 wt %)

Example 9

Except that 20.0 g of fluoro oil was added so that the amount of said fluoro oil became 21.3 wt % with respect to the total weight of the polymer solid content (fluoropolymer) and the fluoro oil of the coating composition, a coating composition was prepared and a coating film sample was produced in the same way as in Example 8.

Example 10

Except that 0.81 g of fluoro oil was added so that the amount of said fluoro oil became 1.08 wt % with respect to the total weight of the polymer solid content (fluoropolymer) and the fluoro oil of the coating composition, a coating composition was prepared and a coating film sample was produced in the same way as in Example 8.

Example 11

Except that 4.21 g of fluoro oil was added so that the amount of said fluoro oil became 5.38 wt % with respect to the total weight of the polymer solid content (fluoropolymer) and the fluoro oil of the coating composition, a coating composition was prepared and a coating film sample was produced in the same way as in Example 8.

Examples 12 to 15

Except that PFPE (decomposition temperature: 409° C.) was used as the fluoro oil, coating compositions were prepared and coating film samples were produced in the same way as in Examples 8 to 11.

Example 16

Except that PFPE (decomposition temperature: 409° C.) was used as the fluoro oil, and 34.3 g of fluoro oil was added so that the amount of said fluoro oil became 31.7 wt %, a coating composition was prepared and a coating film sample was produced in the same way as in Example 8.

Example 17

An amount of 44.4 g of a fluorinated solvent (Vertrel (Registered Trademark) Suprion, manufactured by Du Pont-Mitsui Fluorochemicals Co., Ltd.), 11.1 g of the PFPE of Example 1 as fluoro oil, and 3.1 g of the fluorochemical surfactant (Capstone (Registered Trademark) FS-31) were inserted into a 1 liter stainless steel beaker, and then, stirred for five minutes at 240 rpm using a down flow type propeller type 4-bladed stirrer, after that, 339 g of an aqueous dispersion (average particle diameter of included PFA: approximately 0.2 μm, melting point: 309° C., PFA polymer solid content: 30 wt %) of PFA (TFE/PPVE copolymer) obtained using a method in accordance with a well-known PFA emulsion polymerization method (Patent JP5470044B2) was added, and the contents were stirred for an additional 15 minutes. Finally, 9 mL of 60% nitric acid was added while the contents were stirred to coagulate fluoropolymer primary particles and the fluoro oil together (co-coagulation), and thus a gel-like coagulate was obtained. An amount of 26.6 g of a fluorinated solvent (Vertrel (Registered Trademark) XF, manufactured by Du Pont-Mitsui Fluorochemicals Co., Ltd.) was added, and then, after being stirred for an additional five minutes at 350 rpm, the contents were separated from an aqueous medium to thus obtain a composite coagulated and granulated product of fluorine oil/fluoropolymer (PFA). The product was then put back in pure water, stirred, and washed. After being washed five times, the obtained coagulated and granulated product was dried for three hours as 150° C., and then a portion, having been further subjected to heat treating at 280° C. for one hour, was pulverized for 20 seconds using a small pulverizer (KSMAX, manufactured by Taninaka Co., Ltd.) to thus obtain a fluoro oil/fluoropolymer (PFA) powder coating composition.

The obtained powder coating composition was powder coated onto an aluminum base material which had been subjected to a primer treatment using the method described above, and thus a coating film having a film thickness of 200 μm was formed.

Example 18

The powder coating composition obtained in Example 17 was powder coated onto an aluminum base material which had been subjected to a primer treatment using the method described above, and thus a coating film having a film thickness of 60 μm was formed.

Example 19

An amount of 8.22 g of PFPE (decomposition temperature: 426° C.) as fluoro oil, and 16.44 g of a fluorochemical surfactant (Capstone (Registered Trademark) FS-31 (nonion type fluorochemical surfactant 25% aqueous solution)), manufactured by Chemours Company) were inserted into a 1 liter stainless steel beaker, and then subjected to an ultrasonic dispersion treatment for five minutes using an ultrasonic generator (UE-100Z28S-8A Ultrasonic Generator, manufactured by Ultrasonic Engineering Co., Ltd.). To this was added 200 g of EJ-CL500 (average particle diameter of included PFA: approximately 0.2 μm, melting point: 309° C., PFA polymer solid content: 37 wt %), which is a fluoropolymer (PFA) water based coating for top coating manufactured by Du Pont-Mitsui Fluorochemicals Co., Ltd., and then, the contents were stirred for 15 minutes at 480 rpm using a down flow type propeller type 4-bladed stirrer to obtain a fluoropolymer coating composition.

The obtained coating composition was coated onto an aluminum base material which had been subjected to a primer treatment using the method described above, and thus a coating film sample was produced. (Contained amount of fluoro oil with respect to the total weight of the polymer solid content (fluoropolymer) and the fluoro oil of the fluoropolymer coating composition: 10.0 wt %)

Example 20

An amount of 2.04 g of aluminum oxide (ALUMINA A16 SG, average particle diameter (D50): 0.55 μm, manufactured by Almatis, Inc.) mixed with alcohol for dispersion was added as a filler to the 200 g of the fluoropolymer coating composition obtained in Example 19, and then, the contents were stirred for an additional 10 minutes to thus obtain a fluoropolymer coating composition. (At this time the amount of the filler was 3 wt % with respect to a coating solid content (total amount of the fluoropolymer and the filler).)

The obtained coating composition was coated onto an aluminum base material which had been subjected to a primer treatment using the method described above, and thus a coating film sample was produced. (Contained amount of fluoro oil with respect to the total weight of the polymer solid content (fluoropolymer) and the fluoro oil of the fluoropolymer coating composition: 10.0 wt %)

Example 21

Except that 4.21 of the aluminum oxide (ALUMINA A16 SG, average particle diameter: 0.55 μm, manufactured by Almatis, Inc.) was used, a coating composition was prepared and a coating film sample was produced in the same way as in Example 20. (At this time the amount of the filler was 6 wt % with respect to a coating solid content (total amount of the fluoropolymer and the filler).) (Contained amount of fluoro oil with respect to the total weight of the polymer solid content (fluoropolymer) and the fluoro oil of the fluoropolymer coating composition: 10.0 wt %)

Example 22

Except that 0.67 g of a silicon carbide powder (GC #3000, average particle diameter (D50): 4 μm, manufactured by Fujimi Incorporated) was used as the filler, a coating composition was prepared and a coating film sample was produced in the same way as in Example 20. (At this time the amount of the filler was 1 wt % with respect to a coating solid content (total amount of the fluoropolymer and the filler).) (Contained amount of fluoro oil with respect to the total weight of the polymer solid content (fluoropolymer) and the fluoro oil of the fluoropolymer coating composition: 10.0 wt %)

Example 23

Except that 2.04 g of a silicon carbide powder (GC #3000, average particle diameter (D50): 4 μm, manufactured by Fujimi Incorporated) was used as the filler, a coating composition was prepared and a coating film sample was produced in the same way as in Example 20. (At this time the amount of the filler was 3 wt % with respect to a coating solid content (total amount of the fluoropolymer and the filler).) (Contained amount of fluoro oil with respect to the total weight of the polymer solid content (fluoropolymer) and the fluoro oil of the fluoropolymer coating composition: 10.0 wt %)

Example 24

Except that 4.21 g of a silicon carbide powder (GC #3000, average particle diameter (D50): 4 μm, manufactured by Fujimi Incorporated) was used as the filler, a coating composition was prepared and a coating film sample was produced in the same way as in Example 20. (At this time the amount of the filler was 6 wt % with respect to a polymer solid content (total amount of the fluoropolymer and the filler).) (Contained amount of fluoro oil with respect to the total weight of the polymer solid content (fluoropolymer) and the fluoro oil of the fluoropolymer coating composition: 10.0 wt %)

Example 25

Except that 0.67 g of a silicon carbide powder (P600, average particle diameter (D50): 25.8 μm, manufactured by ESK-SiC, GmbH) was used as the filler, a coating composition was prepared and a coating film sample was produced in the same way as in Example 20. (At this time the amount of the filler was 1.25 wt % with respect to a coating solid content (total amount of the fluoropolymer and the filler).) (Contained amount of fluoro oil with respect to the total weight of the polymer solid content (fluoropolymer) and the fluoro oil of the fluoropolymer coating composition: 10.0 wt %)

Example 26

Except that 2.044 g of a silicon carbide powder (P600, average particle diameter (D50): 25.8 μm, manufactured by ESK-SiC, GmbH) was used as the filler, a coating composition was prepared and a coating film sample was produced in the same way as in Example 20. (At this time the amount of the filler was 3 wt % with respect to a coating solid content (total amount of the fluoropolymer and the filler).) (Contained amount of fluoro oil with respect to the total weight of the polymer solid content (fluoropolymer) and the fluoro oil of the fluoropolymer coating composition: 10.0 wt %)

Example 27

An amount of 5.10 g of an aqueous emulsion of a thermosetting imide (REZEM IM-3, imide concentration: 40 wt %, manufactured by Chukyo Yushi, Co., Ltd.) was added as a filler to 200 g of the fluoropolymer coating composition obtained in Example 19, and then, the contents were stirred an additional 10 minutes to thus obtain a fluoropolymer coating composition. (At this time the amount of the filler (solid content) was 3 wt % with respect to a coating solid content (total amount of the fluoropolymer and the filler (solid content).

The obtained coating composition was coated onto an aluminum base material which had been subjected to a primer treatment using the method described above, and thus a coating film sample was produced. (Contained amount of fluoro oil with respect to the total weight of the polymer solid content (fluoropolymer) and the fluoro oil of the fluoropolymer coating composition: 10.0 wt %)

Example 28

Except that 10.53 g of the aqueous emulsion of a thermosetting imide (REZEM IM-3, imide concentration: 40 wt %, manufactured by Chukyo Yushi, Co., Ltd.) was added as a filler, a coating composition was prepared and a coating film sample was produced in the same way as in Example 27. (At this time the amount of the filler (solid content) was 6 wt % with respect to a coating solid content (total amount of the fluoropolymer and the filler (solid content).) (Contained amount of fluoro oil with respect to the total weight of the polymer solid content (fluoropolymer) and the fluoro oil of the fluoropolymer coating composition: 10.0 wt %)

Example 29

Except that 21.06 g of a silica aqueous dispersion (SNOWTEX C, silica concentration: 20 wt %, particle diameter (D50): 10 to 15 nm, manufactured by Nissan Chemical Industries, Ltd.) was used as the filler, a coating composition was prepared and a coating film sample was produced in the same way as in Example 27. (At this time the amount of the filler (solid content) was 6 wt % with respect to a coating solid content (total amount of the fluoropolymer and the filler (solid content).) (Contained amount of fluoro oil with respect to the total weight of the polymer solid content (fluoropolymer) and the fluoro oil of the fluoropolymer coating composition: 10.0 wt %)

Comparative Example 1

The fluoropolymer (PFA) water based coating for top coating (EJ-CL500, PFA average particle diameter: approximately 0.2 μm, melting point (ASTMD 3307 compliant): 309° C.), manufactured by Du Pont-Mitsui Fluorochemicals Co., Ltd.), which was used in Example 1, was used to coat a base material that had been subjected to a primer treatment using the aforementioned method, and thus a coating film sample was produced.

Comparative Example 2

Except that 2-perfluorohexyl-ethyl methacrylate with a decomposition temperature of 111° C. was used as the fluoro oil, a coating composition was prepared and a coating film sample was produced in the same way as in Example 8.

Comparative Example 3

Except that 13.68 g (fluoro oil of 8.89 g) of a PFPE composition was added as the fluoro oil using a composition (Nikkol NET-HC-04, PFPE 65 wt %, manufactured by Nikko Chemicals Co., Ltd.) containing PFPE having a decomposition temperature of 227° C., a coating composition was prepared and a coating film sample was produced in the same way as in Example 1. (Contained amount of fluoro oil with respect to the total weight of the polymer solid content (fluoropolymer) and the fluoro oil of the fluoropolymer coating composition: 10.7 wt %)

Comparative Example 4

An amount of 200 g of EJ-CL500 (average particle diameter of included PFA: approximately 0.2 μm, melting point: 309° C., PFA polymer solid content: 37 wt %), which is a fluoropolymer (PFA) water based coating for top coating manufactured by Du Pont-Mitsui Fluorochemicals Co., Ltd., was inserted a one liter stainless steel beaker, then 2.29 g of aluminum oxide (ALUMINA A16 SG, average particle diameter (D50): 0.55 μm, manufactured by Almatis, Inc.) mixed with alcohol for dispersion was added as a filler, and then, the contents were stirred for 15 minutes at 480 rpm using a down flow type propeller type 4-bladed stirrer to thus obtain a fluoropolymer coating composition. (At this time the amount of the filler was 3 wt % with respect to a coating solid content (total amount of the fluoropolymer and the filler).)

The obtained coating composition was coated onto an aluminum base material which had been subjected to a primer treatment using the method described above, and thus a coating film sample was produced.

Comparative Example 5

An amount of 200 g of EJ-CL500 (average particle diameter of included PFA: approximately 0.2 μm, melting point: 309° C., PFA polymer solid content: 37 wt %), which is a fluoropolymer (PFA) water based coating for top coating manufactured by Du Pont-Mitsui Fluorochemicals Co., Ltd. was inserted into a one liter stainless steel beaker, then 1.87 g of an aqueous emulsion of a thermosetting imide (REZEM IM-3, imide concentration: 40 wt %, manufactured by Chukyo Yushi, Co., Ltd.) was added as a filler, and then, the contents were stirred for 15 minutes at 480 rpm using a down flow type propeller type 4-bladed stirrer to thus obtain a fluoropolymer coating composition. (At this time the amount of the filler was 1 wt % with respect to a coating solid content (total amount of the fluoropolymer and the filler).)

The obtained coating composition was coated onto an aluminum base material which had been subjected to a primer treatment using the method described above, and thus a coating film sample was produced.

Comparative Example 6

Except that 5.72 g of the aqueous emulsion of a thermosetting imide (REZEM IM-3, imide concentration: 40 wt %, manufactured by Chukyo Yushi, Co., Ltd.) was added as the filler, a coating composition was prepared and a coating film sample was produced in the same way as in Comparative Example 5. (At this time the amount of the filler (solid content) was 3 wt % with respect to a coating solid content (total amount of the fluoropolymer and the filler (solid content).)

Comparative Example 7

Except that 23.62 g of a silica aqueous dispersion (SNOWTEX C, silica concentration: 20 wt %, particle diameter (D50): 10 to 15 nm, manufactured by Nissan Chemical Industries, Ltd.) was used as the filler, a coating composition was prepared and a coating film sample was produced in the same way as in Comparative Example 5. (At this time the amount of the filler (solid content) was 6 wt % with respect to a coating solid content (total amount of the fluoropolymer and the filler (solid content).)

TABLE 1

| Example (Ex) or Comparative Example (CEx) No. | Fluoro oil Product Name | Fluoro oil decomposition temp. | Use of surfactant | Dilution of fluoro oil | Dispersion by ultrasonic | Concentration of Fluoro oil in coating | State of fluoro oil dispersion in coating | Addition of filler | State of coating formation | Fluoro oil coating remaining (film) | n-hexadecane contact angle [°] |
|---|---|---|---|---|---|---|---|---|---|---|---|
| Ex 3 | PFPE | 426° C. | Y | Y | N | 5.4% | Favorable | None | Favorable | 3.3% | 71.9 |
| Ex 1 | | | Y | Y | N | 10.7% | Favorable | None | Favorable | 6.5% | 71.5 |
| Ex 2 | | | Y | Y | N | 21.3% | Favorable | None | Favorable | 11.0% | 70.8 |
| Ex 4 | | | Y | Y | N | 31.7% | Favorable | None | Unevenness (no defects) | 15.8% | 71.3 |
| Ex 5 | | | Y | Y | N | 41.9% | Favorable | None | Generation of defects | 23.1% | 71.1 |
| Ex 6 | | | Y | Y | N | 51.9% | Favorable | None | Generation of defects | 32.5% | 71.7 |
| Ex 7 | | | Y | Y | N | 61.9% | Favorable | None | Generation of defects | 35.7% | 71.4 |
| Ex 10 | | | N | N | N | 1.1% | Favorable | None | Favorable | 0.3% | 61.1 |
| Ex 11 | | | N | N | N | 5.4% | Favorable | None | Favorable | 1.0% | 61.6 |
| Ex 8 | | | N | N | N | 10.7% | Inferior | None | Favorable | 2.0% | 69.3 |
| Ex 9 | | | N | N | N | 21.3% | Inferior | None | Favorable | 6.3% | 71.2 |
| Ex 19 | | | Y | N | Y | 10.0% | Favorable | None | Favorable | 7.0% | 73.1 |
| Ex 20 | | | Y | N | Y | to. 0% | Favorable | Alumina 3% | Favorable | 9.5% | 70.8 |
| Ex 21 | | | Y | N | Y | 10.0% | Favorable | Alumina 6% | Favorable | 7.3% | 73.1 |
| Ex 22 | | | Y | N | Y | 10.0% | Favorable | SiC(4 um)1% | Favorable | Not measured | 71.5 |
| Ex 23 | | | Y | N | Y | 10.0% | Favorable | SiC(4 um)3% | Favorable | 5.8% | 73.8 |
| Ex 24 | | | Y | N | Y | 10.0% | Favorable | SiC(4 um)6% | Favorable | 7.6% | 73.6 |
| Ex 25 | | | Y | N | Y | 10.0% | Favorable | SiC(25.8 um)1% | Favorable | Not measured | 69.6 |
| Ex 26 | | | Y | N | Y | 10.0% | Favorable | SiC(25.8 um)3% | Favorable | 4.4% | 71.1 |
| Ex 27 | | | Y | N | Y | 10.0% | Favorable | PI 3% | Favorable | 8.3% | 72.5 |
| Ex 28 | | | Y | N | Y | 10.0% | Favorable | Pi 6% | Favorable | 8.8% | 71.5 |
| Ex 29 | | | Y | N | Y | 10.0% | Favorable | Silica 6% | Favorable | 8.9% | 68.6 |
| Ex 14 | PFPE | 409° C. | N | N | N | 1.1% | Favorable | | Favorable | Not measured | 59.8 |

TABLE 1-continued

| Example (Ex) or Comparative Example (CEx) No. | Fluoro oil Product Name | Fluoro oil decomposition temp. | Use of surfactant | Dilution of fluoro oil | Dispersion by ultrasonic | Concentration of Fluoro oil in coating | State of fluoro oil dispersion in coating | Addition of filler | State of coating formation | Fluoro oil coating remaining (film) | n-hexadecane contact angle [°] |
|---|---|---|---|---|---|---|---|---|---|---|---|
| Ex 15 | | | N | N | N | 5.4% | Favorable | | Favorable | 1.9% | 61.9 |
| Ex 12 | | | N | N | N | 10.7% | Inferior | | Favorable | 4.4% | 65.8 |
| Ex 13 | | | N | N | N | 21.3% | Inferior | | Favorable | 6.0% | 66.9 |
| Ex 16 | | | N | N | N | 31.7% | Inferior | | Favorable | 8.2% | 71.0 |
| CEx 1 | Not added | | — | — | — | — | — | | Favorable | | 56.4 |
| CEx 4 | | | — | — | — | — | — | Alumina 3% | Favorable | — | 55.3 |
| CEx 5 | | | — | — | — | — | — | PI 1% | Favorable | — | 56.6 |
| CEx 6 | | | — | — | — | — | — | PI 3% | Favorable | — | 57.0 |
| CEx 7 | | | — | — | — | — | — | Silica 6% | Favorable | — | 56.5 |
| Cex 2 | 2-perfluorohexyl-ethylmethacrylate | 111° C. | N | N | N | 10.7% | Favorable | | Favorable | Undetectable | 55.7 |
| Comparative example 3 | PFPE | 227° C. | Y | Y | N | 10.7% | Favorable | | Favorable | Undetectable | 55.3 |

TABLE 2

| | Coating preparation process | Coating film appearance | Coating film performance n-hexadecane contact angle [°] |
|---|---|---|---|
| Ex 17 | Powder coating Thickness: 200 um | Favorable | 70.4 |
| Ex 18 | Powder coating Thickness: 60 um | Favorable | 71.9 |

TABLE 3

| | Coating preparation process | | | State of coating | | | Coating film performance | |
|---|---|---|---|---|---|---|---|---|
| | Use of surfactant | Dilution of fluoro oil | Dispersion of ultrasonic waves | Concentration of F oil in coating | State of fluoro oil dispersion in coating | F oil droplet particle diameter | Fluoro oil coating remaining (film) | n-hexadecane contact angle [°] |
| Ex 1 | Y | Y | N | 10.7% | Favorable | 8.4 | 6.5% | 71.5 |
| Ex 8 | N | N | N | 10.7% | Inferior | 185 | 2.0% | 69.3 |
| Ex 19 | Y | N | Y | 10.0% | Favorable | 5.9 | 7.0% | 73.1 |

TABLE 4

| | Sugar soy sauce (whole surface application) [kgf] | | |
|---|---|---|---|
| | (Initial) Sugar soy sauce | 5th time | After heat treating |
| Ex 3 | 0 | 0 | 0 |
| Ex 1 | 0 | 0 | 0 |
| Ex 2 | 0 | 0 | 0 |
| Cex 1 | 14.3 | 11.7 | 12.1 |

TABLE 5

| | Tribometer measurement | | |
|---|---|---|---|
| | Static coefficient of friction | Dynamic coefficient of friction (50th) | Dynamic coefficient of friction (500th) |
| Ex 3* | 0.029 | 0.017 | 0.026 |
| Ex 1 | 0.030 | 0.015 | 0.014 |
| Ex 2 | 0.021 | 0.016 | 0.009 |
| CEx 1 | 0.040 | 0.022 | 0.022 |

*It is conjectured that the coefficient of friction at the 500th cycle increased in Ex 3 because the Fluoro oil ran out.

TABLE 6

| | Coating formation/Prep. process ||||||| Amount of wear caused by Suga Wear Testing |
| --- | --- | --- | --- | --- | --- | --- | --- | --- |
| | Fluoro oil || Dispersion |||| | n-hexadecane contact angle [°] | Machine after 100 reciprocations with a 1N load (mg) |
| Product Name | Fluoro oil decomposition temp. | Use of surfactant | Dilution of fluoro oil | of ultrasonic waves | Concentration of F oil in coating | Addition of filler | | |
| Ex 19 | PFPE | 426° C. | Y | N | Y | 10.0% | None | 73.1 | 2 |
| Ex 22 | | | Y | N | Y | 10.0% | SiC(4 um)]% | 71.5 | 1.7 |
| Ex 23 | | | Y | N | Y | 10.0% | SiC(4 um) 3% | 73.8 | 1.9 |
| Ex 25 | | | Y | N | Y | 10.0% | SiC(25.8 um)1% | 69.6 | 1 |
| Ex 26 | | | Y | N | Y | 10.0% | SiC(25.8 um) 3% | 71.1 | 1.1 |
| Ex 27 | | | Y | N | Y | 10.0% | PI 3% | 72.5 | 1.6 |
| Ex 29 | | | Y | N | Y | 10.0% | Silica 6% | 68.6 | 1.7 |
| CEx 1 | Not added | — | — | — | — | — | — | 56.4 | 5.1 |
| CEx 4 | | | — | — | — | — | Alumina 3% | 55.3 | 1.3 |
| CEx 5 | | | — | — | — | — | PI 1% | 56.6 | 1.4 |
| CEx 6 | | | — | — | — | — | PI 3% | 57.0 | 1.6 |
| CEx 7 | | | — | — | — | — | Silica 6% | 56.5 | 1.6 |

As is clear from Table 6, the wear resistance of coatings in which the fluoro oil according to the present invention had been dispersed is improved. What is also understood, is that wear resistance is further improved by adding a filler, such as silicon carbide (SiC), polyimide (PI), silica, and the like.

INDUSTRIAL APPLICABILITY

The coating composition according to the present invention is able to form coatings that are able to exhibit excellent non-adhesiveness (releasability) and water and oil repellency over a long period of time, and also has excellent wear resistance, and can thus be appropriately used in the formation of top coating layers for enhancing the releasability of forming molds, and can appropriately be used as a top coating layer for cookware like frying pans, rice cookers, and the like; equipment, such as fixing rolls, belts, inkjet nozzles, and the like; coatings for sliding members, such as seal rings, bearings, and the like; and goods related to industrial equipment, such as piping, and the like.

What is claimed is the following:

1. A fluoropolymer coating composition comprising a tetrafluoroethylene and perfluoro(alkyl vinyl ether) fluoropolymer, a fluorochemical surfactant, and a fluoro oil, wherein the decomposition temperature of said fluoro oil is higher than the melting point of said fluoropolymer, wherein said fluoro oil is dispersed in said coating composition as particles having an average particle diameter of 20 μm or less.

2. The fluoropolymer coating composition of claim 1, wherein said fluoro oil is contained in an amount such that said fluoro oil is 1 to 35 wt % of the total amount of said fluoropolymer and said fluoro oil in said coating composition.

3. The fluoropolymer coating composition of claim 1, wherein the decomposition temperature of said fluoro oil is at least 10° C. higher than the melting point of said fluoropolymer.

4. The fluoropolymer coating composition of claim 1, wherein said fluoropolymer is a melt-processable perfluoropolymer.

5. The fluoropolymer coating composition of claim 1, further comprising a filler.

6. The fluoropolymer coating composition of claim 5, wherein said filler is contained in an amount of 0.1 to 10 wt % based on the total filler and fluoropolymer content of said coating composition.

7. The fluoropolymer coating composition of claim 1, wherein said coating composition is a water based coating or a powder coating.

8. The fluoropolymer coating composition of claim 1, wherein said coating composition is used as a top coat.

9. The fluoropolymer coating composition of claim 1, wherein the fluoropolymer is present in the fluoropolymer coating composition in an amount of at least 80 wt %, based on a coating solid content of the fluoropolymer coating composition.

10. The fluoropolymer coating composition of claim 1, wherein the fluorochemical surfactant is present in an amount, by weight, of 1 to 150 parts per 100 parts of fluoro oil.

11. The fluoropolymer coating composition of claim 2, wherein said fluoro oil is contained in an amount such that said fluoro oil is 5 to 20 wt % of the total amount of said fluoropolymer and said fluoro oil in said coating composition.

12. The fluoropolymer coating composition of claim 1, wherein said coating composition is used as a coating having a thickness of at least 5 μm.

* * * * *